(12) United States Patent
Benjey et al.

(10) Patent No.: US 6,298,540 B1
(45) Date of Patent: Oct. 9, 2001

(54) COMBINED FUEL PUMP, LEVEL SENDER AND ROLLOVER VENTING VALVE FOR A FUEL TANK

(75) Inventors: Robert P. Benjey, Dexter; Vaughn K. Mills, Chelsea, both of MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/672,540

(22) Filed: Sep. 28, 2000

(51) Int. Cl.$^7$ ............................. B21D 39/00; B23P 21/00
(52) U.S. Cl. ................................. 29/452; 29/469
(58) Field of Search .................... 29/469, 888.01, 29/453, 452; 220/735, 562, 653, 651, 86.2

(56) References Cited

U.S. PATENT DOCUMENTS

| | | | |
|---|---|---|---|
| 3,635,182 | * 1/1972 | Paffett | 114/0.5 |
| 3,912,103 | * 10/1975 | Gerhard | 220/1.5 |
| 4,783,896 | * 11/1988 | Stubbe et al. | 29/469 |
| 4,826,408 | * 5/1989 | Inoue et al. | 29/469 |
| 5,263,604 | * 11/1993 | Metz | 220/653 |
| 5,322,099 | * 6/1994 | Langlois | 141/307 |
| 5,360,040 | * 11/1994 | Thorn et al. | 220/86.2 |
| 5,547,096 | * 8/1996 | Kleyn | 220/562 |
| 5,669,361 | * 9/1997 | Weissinger et al. | 123/520 |
| 5,701,928 | * 12/1997 | Aoki | 137/312 |
| 5,813,566 | * 9/1998 | Bradford et al. | 220/653 |
| 5,853,103 | * 12/1998 | Yamazaki | 220/562 |
| 5,931,335 | * 8/1999 | Cippitani | 220/562 |
| 6,135,306 | * 10/2000 | Clayton et al. | 220/562 |
| 6,138,857 | * 10/2000 | Keller | 220/86.2 |
| 6,167,920 | * 1/2001 | Enge | 141/5 |

\* cited by examiner

*Primary Examiner*—S. Thomas Hughes
*Assistant Examiner*—Marc Jimenez
(74) *Attorney, Agent, or Firm*—Roger A. Johnston

(57) ABSTRACT

A combination rollover/vent valve, fuel pump and fuel level sender which is installed through a single access opening in the top of a fuel tank. The rollover/vent valve has a resilient mounting strip attached and the rollover/vent valve is attached to the fuel pump level sender module by a substantially rigid vent tube and the vent tube is ported exteriorly through the module. Upon insertion of the rollover/vent valve through the access opening, the mounting strip engages ratchet teeth formed in the top and bottom of the tank to secure the rollover/vent valve at a location of the highest level of the tank, remote from the module. The module thus locates the vent line, fuel feed line and electrical connections all at a single location on the tank top. The vent tube may be formed to a curved configuration to accommodate a dished or recessed tank top.

7 Claims, 3 Drawing Sheets

COMBINED FUEL PUMP, LEVEL SENDER AND ROLLOVER VENTING VALVE FOR A FUEL TANK

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to the installation of fuel pumps, fuel level senders and rollover/venting valves for motor vehicle fuel tanks.

In order to provide protection against fuel spilling from the vapor vent line in a fuel tank, in the event of a vehicle rollover, it has been mandated that motor vehicle fuel tanks be equipped with valves which close the vapor vent when the vehicle is tilted beyond a threshold amount from the normal upright position. Such rollover/vent valves typically employ a float which closes the valve when the liquid level of the fuel rises above a predetermined level in order to prevent liquid fuel from sloshing out of the vapor vent either during normal operation or in the event of rollover. Further, it is necessary to locate the valve in the highest portion or the location of the deepest fuel level in order to provide vapor venting at all levels of fuel up to the maximum fuel level.

Heretofore, such rollover/vent valves have been installed through an access opening provided in the fuel tank at the highest location thereon and sealed and secured over the opening.

This requirement for the placement of the rollover/vent valve has required plural access openings in the top of the fuel tank in order to properly locate the rollover/vent valve and also to provide an access opening for the installation of the fuel pump and level sender mechanism for providing remote readout of the fuel level to the vehicle operator. The plural access openings in the top of the fuel tank require a seal around each opening and thus the probability of a faulty seal and leakage has been increased. In addition the need for plural access openings has weakened the structural integrity of the top of the fuel tank and has increased the cost of fabricating the tank.

Furthermore, in many of the recent passenger and light truck vehicle designs, it has been necessary to provide a dished out or recessed area in the top of the fuel tank in order to properly locate and fit the fuel tank underneath the vehicle platform. This structural arrangement has made it extremely difficult to provide installation and connection of the vapor vent lines to the rollover/vent valve upon installation of the tank onto the vehicle during vehicle assembly. Such an arrangement has also complicated the routing of the vent and fuel feed lines and the electric supply leads to the fuel pump.

It has thus long been desired to find a way or means of simplifying the installation of the rollover/vent valve, fuel pump and fuel sender devices onto a fuel tank in a manner which reduces the number of access openings in the top of the tank and enables all the lines to be commonly routed to a single access opening. It has further been desirable to eliminate the plural access openings in the top of the fuel tank to reduce the number of areas requiring seals and thus the probability of leakage in the event of faulty sealing either during installation or in service.

BRIEF SUMMARY OF THE INVENTION

The present invention provides a combination fuel pump, level sender and rollover/vent valve assembly capable of being installed as an integral unit through a single access opening in the top of a fuel tank. The assembly of the present invention includes a rollover valve having a resilient mounting strip attached thereto and the rollover valve is connected to the fuel pump/level sender module by a substantially rigid conduit. The rollover valve with the mounting strip and one end of the conduit for vapor venting attached thereto is inserted in the fuel tank; and, one end of the retaining strip is moved along the bottom of the tank until ratchet surfaces provided in the bottom of the tank are engaged. The conduit and rollover valve are pivoted to cause the opposite end of the retaining strip to engage corresponding ratchet surfaces in the top of the tank to secure the rollover valve in a predetermined location at the highest point in the tank. The fuel pump/level sender module is then attached to the conduit and sealed over the access opening. In an alternate arrangement, the conduit connecting the rollover/vent valve and the fuel pump module maybe configured to conform to the recessed or dished shape of the top of the fuel tank to enable locating the rollover/vent valve at the highest level in the tank. The present invention thus provides a convenient way of installing a rollover/vent valve in a region of the tank remote from the access opening to provide proper location of the vent valve at the top of the deepest section of the tank. The arrangement of the present invention reduces the number of openings requiring sealing in the top of the tank. and permits all of the electrical and fluid conduit connections to be made at a common location on the top of the tank, thereby facilitating installation of the tank on the motor vehicle.

DETAILED DESCRIPTION OF THE INVENTION

Figure 1:
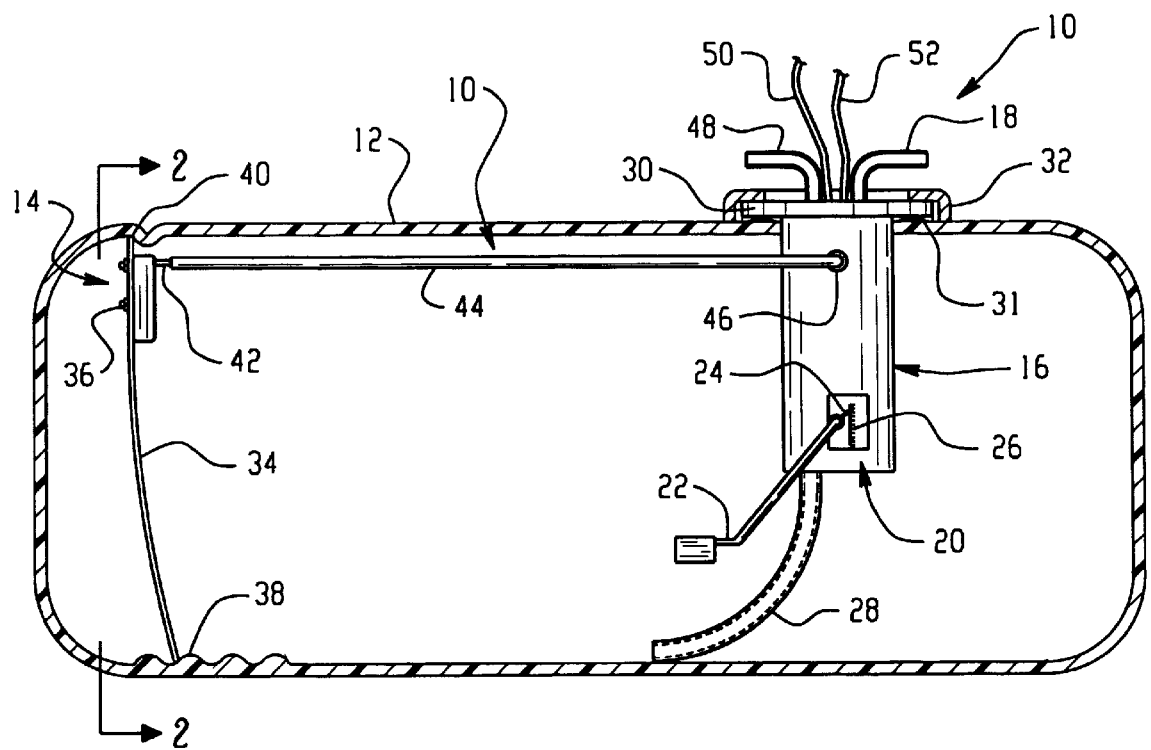
FIG. 1 is a cross-section of a vehicle fuel tank having a generally rectangular transverse section.

Referring to FIG. 1, the assembly of the present invention is indicated generally at 10 installed in a flat topped fuel tank 12 having a generally rectangular cross-section. The assembly 10 includes a rollover/vent valve indicated generally at 14 and a module indicated generally at 16 which includes internally therein, but is unshown, a fuel pump with a fuel delivery tube 18 extending outwardly therefrom. The module 16 includes a liquid level sender indicated generally at 20 which includes a float arm 22 pivoted for movement of a wiper 24 which makes contact with a potentiometer or variable resistor 26 which is typically of the wire wound variety mounted on the exterior of the module 16. The module also includes a fuel feed tube 28 which extends to the bottom of the fuel tank from the module. The module 16 includes an outwardly extending annular flange 30 at the exterior or upper end thereof, which flange is sealed by a gasket 31 or other sealant on upper surface of the tank and retained in position thereon by any suitable mechanical means, as for example, a bayonet twist lock arrangement with locking ring 32 attached to the top of the tank in a manner well known in the art.

Figure 2:
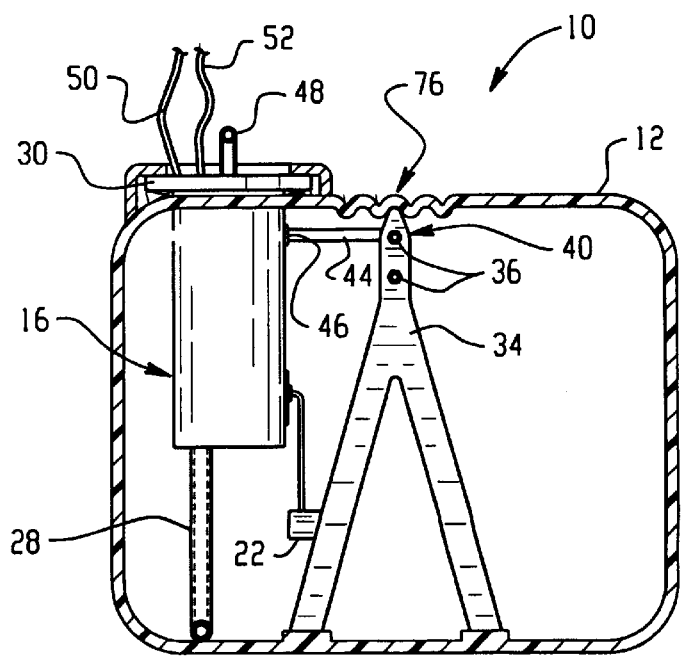
FIG. 2 is a section view taken along section-indicating lines 2—2 of FIG. 1.

The valve 14 has a resiliently deflectable mounting strip 34 attached to the valve by suitable fastening means 36 adjacent one end thereof. The strip 34 has its opposite or lower end engaged in ratchet surfaces 38 provided in the bottom of the fuel tank and upper end 40 located in notches 76 provided in the top of the fuel tank, both are preferably formed integrally therewith. Referring to FIG. 2, mounting strip 34 has the lower end preferably formed in a bifurcated or inverted "V" configuration.

The vent outlet of the valve 16 as indicated by reference numeral 42 is connected to one end of a substantially rigid conduit 44 which has its opposite end connected to a vent port 46 provided in the module 16 which port 46 is connected to an exterior vent tube 48 extending outwardly from the top of the module exteriorly of the tank. The pump module 16 also has electrical leads 50, 52 extending outwardly from the flanged top 30 of the module 16 for connection to an on-board source of electrical power for the fuel pump (not shown) housed within module 16.

Figure 3:
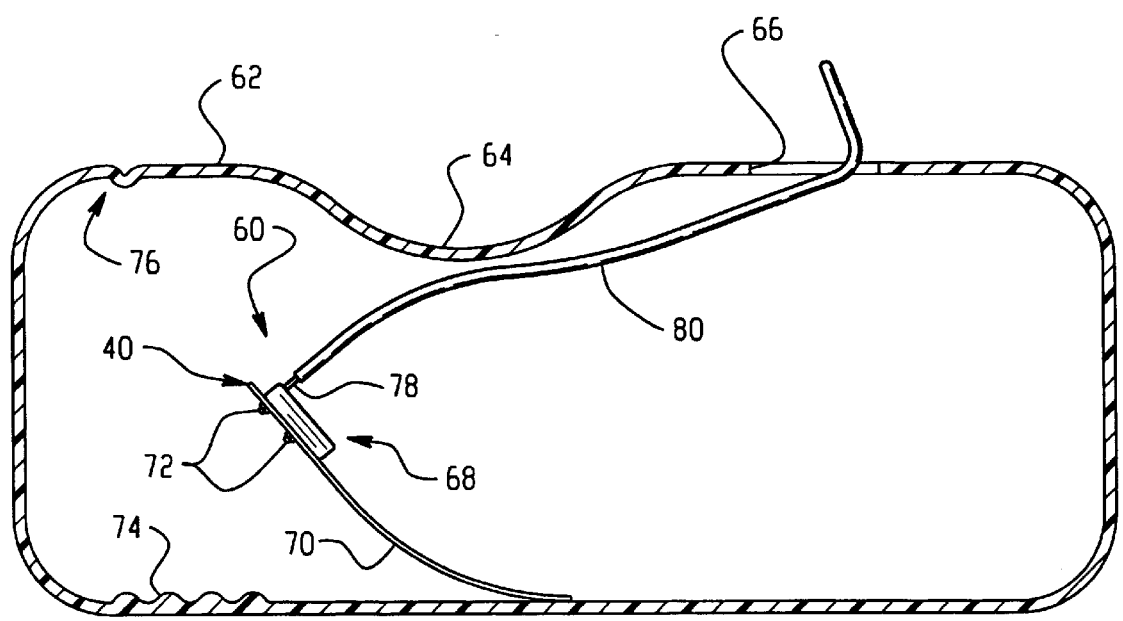
FIG. 3 is a view similar to FIG. 1 showing the first phase of the invention being installed in a fuel tank having a recessed top.
Figure 4:
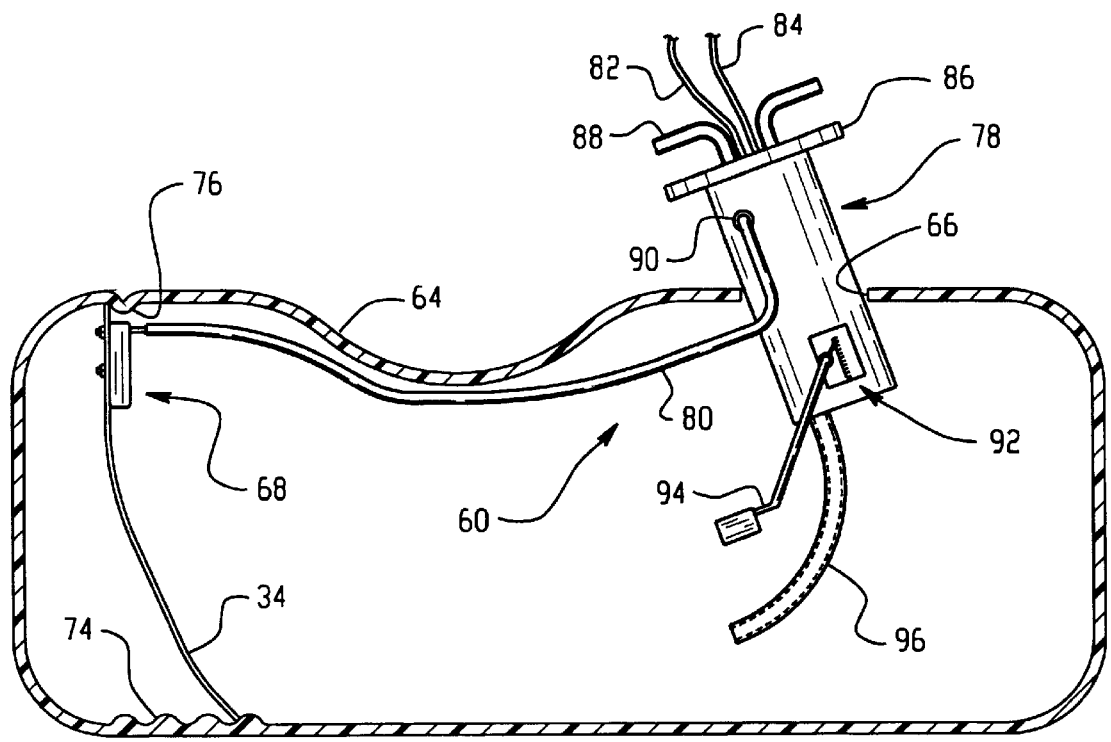
FIG. 4 is a view similar to FIG. 3 showing the second phase of the installation of the invention in the tank of FIG. 3; and, FIG. 5 is a view similar to FIG. 4 showing the assembly of the present invention completely installed and the fuel tank of FIG. 3.
Figure 5:
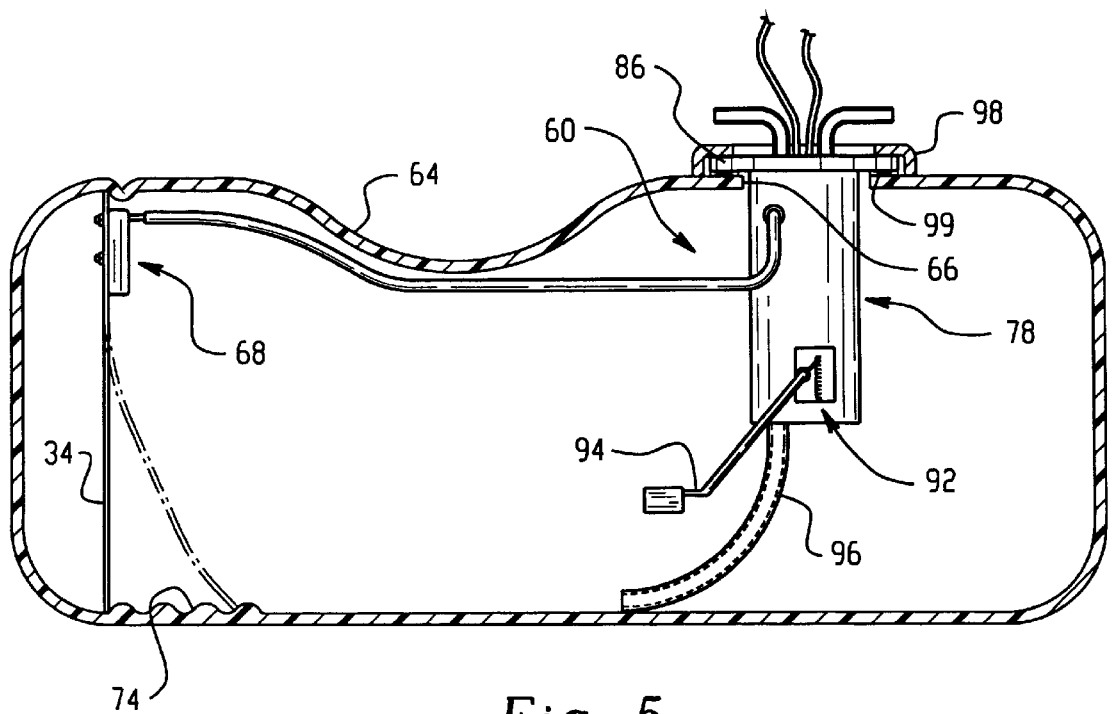

Referring to FIGS. 3 through 5, another embodiment of the invention is indicated generally at 60 and is shown installed in a fuel tank 62 having a dished or recessed portion 62 of the upper wall which is adapted for conforming to certain portions of a vehicle structure (not shown). The assembly 60 is shown in FIG. 3 in the initial stages or first phase of installation through a single access opening 66 provided in the tank wherein a rollover/vent valve indicated generally at 68 has a resilient elongated strip 70 attached thereto adjacent one or the upper end thereof by suitable fasteners 72. The opposite or lower end of strip 70 is deflected against the bottom of the fuel tank as the valve 68 is moved into position under the upper wall of the tank at the deepest section thereof Tank 62 has a plurality of engagement surfaces 74 provided on the bottom thereof at the desired location for valve 68; and, in the present practice of the invention the surfaces 74 have a ratchet or toothed configuration. A similar set of mounting surfaces 76 is disposed on the interior of the upper wall of the tank at the desired location for valve 68 but perpendicular to the teeth 74.

Valve 68 has its vent outlet 78 connected to one end of a substantially rigid tube 80 which is configured to conform to the recess in the top wall 64 of the tank. The opposite end of tube 80 extends outwardly through the access opening 66.

Referring to FIG. 4, the valve 68 has been moved further in the tank to a second phase position where mounting strip 70 has its upper end located in teeth 76 in the upper wall of the tank; and, the lower end has begun to engage the ratchet teeth 74 in the bottom of the tank. The fuel pump module indicated generally at 78 has now been attached to the end of the conduit 80 extending outwardly of the tank through access opening 66. Module 78 includes an electric fuel pump (not shown) disposed therewithin which has electrical leads 82, 84 extending outwardly from an annular mounting flange 86 provided at the upper end of the module 78. Module 78 has an exterior vent tube 88 extending from the top of the module 78 and which is connected to the vent tube 80 through the module connection port 90. The module 16 has a fuel level sender, which may be of the potentiometer type, indicated generally at 92 and which has a liquid level float arm 94 extending therefrom for responding to the changes in the fuel level in the tank. Module 78 also has a fuel feed tube 96 extending downwardly therefrom which is connected to the inlet of the electric fuel pimp (not shown) disposed within module 78.

Referring to FIG. 5, the module is shown completely inserted into the tank through the access opening 66; and, the valve 68 has been pivoted into position ratcheting the lower end of strip 34 into a final desired position with respect to the surfaces 74 provided in the bottom of the tank. In the final desired position, the fuel feed tube 96 is positioned against the bottom of the tank to permit full utilization of the liquid in the tank. It will be understood that the undersurface of module flange 86 is sealed against the top of the access opening 66 by a gasket 99 and retained thereon by bayonet twist locking with a retaining ring 98 provided on the upper surface of the tank around opening 66 in a manner known in the art.

The present invention thus permits installation, as a single unit, the combination of a rollover/vent valve fuel pump module and fuel level sender through a single access opening in a fuel tank, thereby eliminating additional access openings in the upper surface of the tank and reducing the potential for leakage. The present invention utilizes a substantially rigid conduit for attaching the rollover/vent valve to the fuel module for remote positioning of the rollover/vent in the tank and provides for a single location for the connection of the fuel feed line, the vent hose and the pump electrical connections.

Although the invention has hereinabove been described with respect to the illustrated embodiments, it will be understood that the invention is capable of modification and variation and is limited only by the following claims.

What is claimed is:

1. A method of installing a combined fuel pump, float level sender and rollover valve in a fuel tank comprising:
   (a) forming a plurality of engagement surfaces at a predetermined location on the top and bottom surfaces of the interior of the fuel tank;
   (b) forming a resilient mounting member and attaching a rollover valve to the mounting member;
   (c) disposing a fuel level sender on a module including a pump and vent passage and interconnecting said rollover valve and said module vent passage with a conduit and forming a subassembly of said mounting member, said rollover valve, said conduit and said module;
   (d) inserting said subassembly through an aperture in the top of the tank and contacting said engagement surfaces with mounting member and securing said mounting member between said top and bottom engagement surfaces and locating said rollover valve at the highest level in the tank;
   (e) securing said module to the top of the tank and sealing the said module about said aperture; and, (f) connecting a fuel vapor line to said module externally with respect to said tank and connecting said vapor line to said conduit.

2. The method defined in claim 1, wherein said step of forming a mounting member includes forming an elongated strip and connecting an end of said strip to said rollover valve.

3. The method defined in claim 1, wherein said step of contacting said engagement surfaces includes resiliently deflecting said mounting member.

4. The method defined in claim 1, wherein said step of forming a plurality of engagement surfaces includes forming a series of ratchet teeth.

5. The method defined in claim 1, wherein said step of interconnecting includes forming a conduit configured to follow the contour of a dished top of the tank.

6. The method defined in claim 1, wherein said step of forming a resilient mounting member includes forming an elongated bifurcated member.

7. The method defined in claim 1, wherein said step of forming a resilient mounting member includes forming a relatively thin elongated strip of material; and, said step of attaching includes attaching an end of said strip to said rollover valve.

* * * * *